(12) United States Patent
Afshar

(10) Patent No.: US 11,867,617 B2
(45) Date of Patent: Jan. 9, 2024

(54) BEAM CONDUCTING CAVITY STRUCTURE, GAS SENSOR AND METHOD FOR PRODUCTION THEREOF

(71) Applicant: OSRAM OLED GmbH, Regensburg (DE)

(72) Inventor: Farhang Ghasemi Afshar, Wenzenbach (DE)

(73) Assignee: OSRAM OLED GmbH, Regensburg (DE)

( * ) Notice: Subject to any disclaimer, the term of this patent is extended or adjusted under 35 U.S.C. 154(b) by 339 days.

(21) Appl. No.: 17/275,104

(22) PCT Filed: Sep. 2, 2019

(86) PCT No.: PCT/EP2019/073349
§ 371 (c)(1),
(2) Date: Mar. 10, 2021

(87) PCT Pub. No.: WO2020/053018
PCT Pub. Date: Mar. 19, 2020

(65) Prior Publication Data
US 2022/0026352 A1 Jan. 27, 2022

(30) Foreign Application Priority Data

Sep. 13, 2018 (DE) .......................... 102018215587.9

(51) Int. Cl.
*G01N 21/3504* (2014.01)
*G01N 21/61* (2006.01)
*G01N 21/03* (2006.01)

(52) U.S. Cl.
CPC ....... *G01N 21/3504* (2013.01); *G01N 21/031* (2013.01); *G01N 21/61* (2013.01); *G01N 2201/0668* (2013.01)

(58) Field of Classification Search
CPC .. G01N 21/3504; G01N 21/031; G01N 21/61; G01N 2201/0668
See application file for complete search history.

(56) References Cited

U.S. PATENT DOCUMENTS 6,843,102 B1 * 1/2005 Shulga ................ G01N 21/274
73/24.02
8,083,379 B2 12/2011 Schulz et al.
(Continued)

FOREIGN PATENT DOCUMENTS

| DE | 102006044019 A1 | 3/2008 |
| EP | 0825430 B1 | 3/2006 |
| WO | 2018069624 A1 | 4/2018 |

*Primary Examiner* — Jamil Ahmed
(74) *Attorney, Agent, or Firm* — Slater Matsil, LLP

(57) ABSTRACT

In an embodiment a beam-guiding cavity structure includes at least one first curved surface, one second curved surface and one third curved surface spanning a cavity, the first-third curved surfaces respectively having at least one first focal point and one second focal point, wherein the cavity is configured such that substantially no distance is laterally formed between the first focal point of the first curved surface and the second focal point of the second curved surface, wherein the cavity is further configured such that substantially no distance is laterally formed between the first focal point of the second curved surface and the second focal point of the third curved surface, wherein the first focal point of the second curved surface is arranged next to a connecting line of the first and second focal points of the first curved surface, wherein the first focal point of the third curved surface is arranged next to a connecting line of the first and second focal points of the second curved surface, and wherein the first, second and third curved surfaces have different shapes or dimensions to one another.

17 Claims, 7 Drawing Sheets

(56) References Cited

U.S. PATENT DOCUMENTS

| | | | |
|---|---|---|---|
| 10,884,225 B2 | 1/2021 | Boutami | |
| 2004/0218261 A1* | 11/2004 | Tuunanen | G01J 3/02 |
| | | | 359/364 |
| 2015/0377767 A1* | 12/2015 | Chiesi | G01N 21/0303 |
| | | | 356/437 |
| 2016/0252451 A1* | 9/2016 | Kawate | G01N 21/47 |
| | | | 359/858 |

* cited by examiner

BEAM CONDUCTING CAVITY STRUCTURE, GAS SENSOR AND METHOD FOR PRODUCTION THEREOF

This patent application is a national phase filing under section 371 of PCT/EP2019/073349, filed Sep. 2, 2019, which claims the priority of German patent application 102018215587.9, filed Sep. 13, 2018, each of which is incorporated herein by reference in its entirety.

TECHNICAL FIELD

In various embodiments, a beam-guiding cavity structure, a gas sensor and methods for the production thereof are provided.

BACKGROUND

A conventional non-dispersive infrared (NDIR) gas sensor comprises an emitter and a detector, which are optically connected to one another by a gas cell. In the gas cell, the light path between the emitter and the detector should be long enough to achieve meaningful (measurable) absorption of electromagnetic radiation emitted by the emitter by gas molecules. Increasing the light path leads to an increase in the sensor dimensions on the one hand and a decrease in the light incident on the detector surface because of optical losses, which leads to a poor signal-to-noise ratio of the gas sensor.

SUMMARY

Embodiments provide a beam-guiding cavity structure. The beam-guiding cavity structure comprises a cavity having at least one first curved surface and one second curved surface, which span a cavity. The first and second curved surfaces respectively have at least one first focal point and one second focal point. The cavity is configured in such a way that no distance, or substantially no distance, is formed laterally between the first focal point of the first curved surface and the second focal point of the second curved surface and the first focal point of the second curved surface is arranged next to the connecting line of the first and second focal points of the first curved surface.

By means of the arrangement and configuration of the curved surfaces, the optical length of the beam-guiding cavity structure can be increased, while the spatial extent of the beam-guiding cavity structure can be kept small. This clearly allows a compactly configurable beam-guiding cavity structure.

The beam-guiding cavity structure is configured, for example in respect of the shape and reflectivity of the curved surface(s), in such a way that (a substantial proportion or substantially all of the) electromagnetic radiation from the second focal point impinges on the first focal point after (precisely one) reflection at the curved surface, for example by the curved surface having an ellipsoidal shape.

A focal point may also be referred to as a mathematical focal point or focus point of the geometrical curve. The curved surface may have the shape of different ellipses in different directions, may for example be describable direction-dependently by means of different conic sections, and may therefore have more than two focal points. In other words: the (partial) cavity spanned by means of a curved surface may not be point-symmetrical, mirror-symmetrical or rotationally symmetrical in various spatial directions.

In the context of this description, a cavity is a hollow space which is at least partially bounded or defined by the curved surfaces. The curved surface(s) is/are formed by a material, for example a molded body, which encloses or surrounds the cavity. The material, or the curved surface(s), may however comprise one or more openings, for example as a gas inlet, as a gas outlet or as a reception region for an emitter and/or detector. In other words: in various exemplary embodiments the cavity may be open, or non-closed, or isolated.

Between the second focal point of the first curved surface and the first focal point of the second curved surface, the beam-guiding cavity structure is transmissive for electromagnetic radiation and configured to receive a gas (analyte). It is in this case to be understood that the first and second curved surfaces span a/the cavity which is transmissive for the electromagnetic radiation and is configured to receive the analyte, or a gas or gas mixture.

In the context of this description, a curved surface has a radius of curvature. It is not, however, necessary for the radius of curvature of the curved surface as seen from a focal point to be the same for two different solid angles. In other words: the curved surface may for example have an elliptical shape with respect to (respectively) a focal point. The roughness or waviness of a "smooth surface" may likewise be described with a radius of curvature. The curved surface due to roughness and waviness is not, however, to be understood as curved surface in the context of this description.

That no distance, or substantially no distance, is arranged laterally between the first focal point of the first curved surface and the second focal point of the second curved surface is intended to mean that the positions of these focal points are substantially identical in position, and for example overlap or are superimposed.

The connecting line of the focal points starts at one of the two focal points and ends at the other focal point of the two focal points. The connecting line of the focal points is to be understood as a geometrical/mathematical construction, and means that the first focal point of the second curved surface is offset at least laterally with respect to the connecting line of the first and second focal points, for example, when the first and second curved surfaces have the same shape and dimension, by rotation of the second curved surface about the first focal point (which is substantially identical in position to the second focal point of the second curved surface) of the first curved surface. In other words: the first focal point of the second curved surface is not arranged directly (on the connecting line) between the first and second focal points of the first curve surface. In various exemplary embodiments, the focal points of the first and second curved surfaces are arranged in the same plane, or in a common plane.

In the case of an elliptical curved surface, the connecting line of the focal points may also be described by means of the bilateral (from the two focal points) linear eccentricity (the distance of the focal point from the geometrical center).

According to a further aspect, the object is achieved by a gas sensor. The gas sensor comprises an above-described beam-guiding cavity structure. The gas sensor comprises an emitter which is configured to emit electromagnetic radiation, and comprises a detector which is configured to detect the electromagnetic radiation. The detector is optically coupled to the emitter by the beam-guiding cavity structure.

This makes a gas sensor having a compact design possible. Furthermore, the beam-guiding cavity structure has the effect that the number of reflections of the electromagnetic radiation between the focal points at the curved surface (s), and therefore the power loss, are reduced. In this way, the emitter may be operated with a lower power and the energy consumption may therefore be reduced. As an alternative or in addition, a detector having a lower sensitivity may be used. As an alternative or in addition, the detection limit of an analyte (gas to be detected) may be improved.

According to a further aspect, the object is achieved by a method for producing a beam-guiding cavity structure. The method comprises formation of a beam-guiding cavity having at least one first curved surface and one second curved surface, which span a cavity. The first and second curved surfaces respectively have at least one first focal point and one second focal point. The cavity is configured in such a way that no distance, or substantially no distance, is formed laterally between the first focal point of the first curved surface and the second focal point of the second curved surface. The first focal point of the second curved surface is arranged next to the connecting line of the first and second focal points of the first curved surface.

According to a further aspect, the object is achieved by a method for producing a gas sensor. The method comprises formation of a beam-guiding cavity structure with at least one first curved surface and one second curved surface, which span a cavity. The first and second curved surfaces respectively have a first focal point and a second focal point. The cavity is configured in such a way that no distance, or substantially no distance, is formed laterally between the first focal point of the first curved surface and the second focal point of the second curved surface. The first focal point of the second curved surface is arranged next to the connecting line of the first and second focal points of the first curved surface. The method furthermore comprises arrangement of an emitter, which is configured to emit electromagnetic radiation, so that the emitter is optically coupled to the beam-guiding cavity structure. The method furthermore comprises arrangement of a detector, which is configured to detect the electromagnetic radiation, so that the detector is optically coupled to the emitter by the beam-guiding cavity structure.

BRIEF DESCRIPTION OF THE DRAWINGS

Exemplary embodiments of the invention are represented in the figures and will be explained in more detail below.

DETAILED DESCRIPTION OF ILLUSTRATIVE EMBODIMENTS

In the following detailed description, reference is made to the appended drawings, which form part of this description and in which specific embodiments, in which the invention may be carried out, are shown for illustration. In this regard, direction terminology such as "up", "down", "forward", "backward", "front", "rear", etc. is used with reference to the orientation of the figure(s) being described. Since component parts of exemplary embodiments may be positioned in a number of different orientations, the direction terminology is used for illustration and is in no way restrictive. It is to be understood that other exemplary embodiments may be used, and structural or logical vacations may be carried out, without departing from the protective scope of the present invention. It is to be understood that the features of the various exemplary embodiments described herein may be combined with one another, unless otherwise specifically indicated. The following detailed description is therefore not to be interpreted in a restrictive sense, and the protective scope of the present invention is defined by the appended claims.

In the context of this description, terms such as "connected", "attached" or "coupled" are used to describe both direct and indirect connection, direct or indirect attachment and direct or indirect coupling. In the figures, elements which are identical or similar are provided with identical references, insofar as this is expedient.

Figure 1:
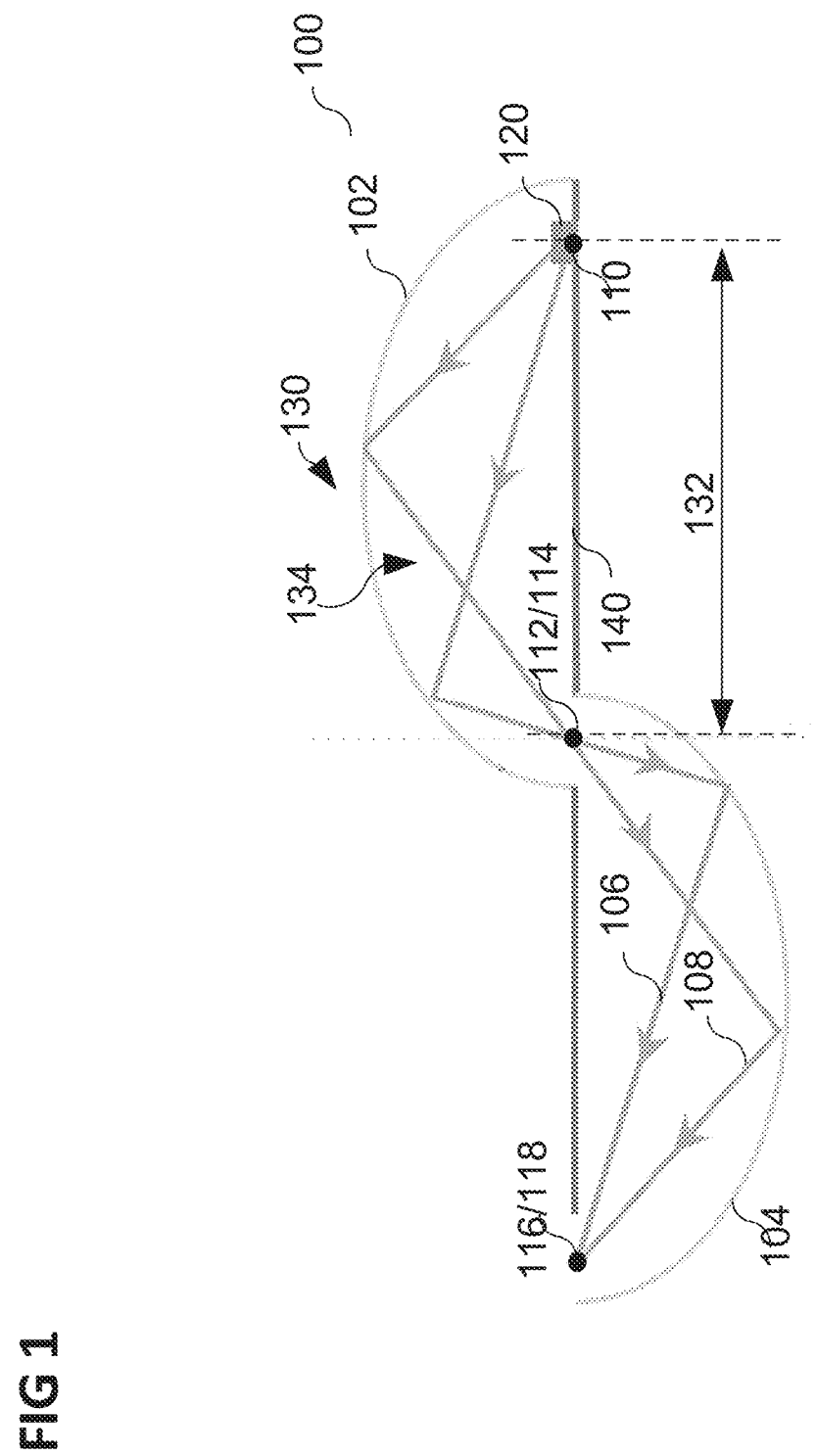
FIG. 1 shows a schematic cross-sectional view of a gas sensor having a beam-guiding cavity structure according to various embodiments.

FIG. 1 shows a schematic cross-sectional view of a gas sensor 100 having a beam-guiding cavity structure 130 according to various embodiments.

In various exemplary embodiments, a gas sensor 100 comprises a beam-guiding cavity structure 130, an emitter 120 and a detector 118.

The emitter 120 is configured to emit electromagnetic radiation 106, 108.

The detector 118 is configured to detect the electromagnetic radiation 106, 108.

The detector 118 is optically coupled to the emitter by the beam-guiding cavity structure 130.

In various exemplary embodiments, the beam-guiding cavity structure 130 comprises at least one first curved surface 102 and one second curved surface 104. The first and second curved surfaces 102, 104 span a hollow space (cavity 134). The first curved surface 102 has at least one first focal point 112 and one second focal point 110, and the second curved surface 104 has at least one first focal point 114 and one second focal point 116.

The cavity 134 is configured in such a way that no distance, or substantially no distance, is formed laterally between the first focal point 112 of the first curved surface 102 and the second focal point 114 of the second curved surface 104. In other words: the two curved surfaces 102, 104, for example in the shape of ellipses halved in the longitudinal direction, have a common focal point (also referred to as a mathematical focal point or focus point).

The emitter 120 may be arranged at the second focal point 110 of the first curved surface 102 and is configured to emit the electromagnetic radiation 106, 108 in the direction of the first curved surface 102. By means of the first curved surface 102, a collimator for collimating the electromagnetic radiation 106, 108 is optional, or not necessary.

The first curved surface 102 is configured to be highly reflective for the electromagnetic radiation 106, 108. The curved surfaces 102, 104 are, for example, configured in such a way that they have a reflectivity of more than 80%, for example more than 90%, for example more than 95%, at the wavelength of the electromagnetic radiation 106, 108 emitted by the emitter 120. The first and/or second curved surface 102, 104 are, for example, configured in such a way that they are substantially non-diffusely or scatteringly reflective. The first curved surface 102 and/or the second surface 104 may be configured to be specular, or specularly reflective. In other words: the first and/or second curved surfaces 102, 104 are for example configured to be reflective in a specular, mirror-like or imaging fashion. For example, the first and/or second curved surface 102, 104 are formed by a molded body or a coating of a smooth (for example polished) metal, for example gold, silver, aluminum.

The shape and reflectivity of the first curved surface makes it possible for a part, or a substantial part, of the electromagnetic radiation 106, 108 to travel from the emitter 120 with a low number of reflections, for example by means of only a single reflection in the case of an ellipsoidal first curved surface 102, to the second focal point 112 of the first curved surface 102.

The second focal point 114 of the second curved surface 104 is arranged at least laterally with no distance, or no substantial distance, from the first focal point 112 of the first curved surface 102. In other words: the focal points 112, 114 are identical, the same or substantially the same, for example except for a positioning accuracy.

By means of the low number of reflections, the electromagnetic radiation and therefore the emitter 120, which is arranged at the second focal point no of the first curved surface 102, is imaged, or mirrored, onto the second focal point 116 of the second curved surface 104. The electromagnetic radiation 106, 108 incident at the second focal point 116 of the second curved surface 104 from the first curved surface 102 is forwarded to the first focal point 116 of the second curved surface 104 by means of a low number of reflections, for example only one reflection.

A detector 118 which is configured to detect the electromagnetic radiation 106, 108 of the emitter 120, may be arranged at the first focal point 116 of the second curved surface 104. As an alternative, the second focal point of a third curved surface (illustrated in FIG. 2) may be arranged at the first focal point of the second curved surface 104. In other words: two or more curved surfaces may be "interconnected" or "coupled" in series.

This allows wave guiding of the electromagnetic radiation 106, 108 in the cavity 134 formed by means of the first and second (and optionally further) curved surfaces 102, 104 with a low number of reflections. This can make it possible for the electromagnetic radiation 106, 108 which is emitted by the emitter 120 to be forwarded to the detector 118 by means of a low number of reflections. A low number of reflections may mean a low number of scattering and absorption losses at or in the material which forms the respective curved surface. In this way, the energy consumption of the emitter 120 may be reduced and/or the sensitivity (the required signal-to-noise ratio) of the detector 118 may be reduced.

By means of the shape of the two or more curved surfaces (see also FIG. 2) of the gas sensor 100, the optical path length of the electromagnetic radiation 106, 108 between the emitter 120 and the detector 118 may be extended. In this way, the proportion of electromagnetic radiation 106, 108 which is absorbed by the analyte may be increased. An analyte is in this case a gas to be studied, the presence or proportion of which in a gas mixture is intended to be registered. The cavity 134 is to this end configured to be permeable for at least one gas (analyte) and transmissive for at least one electromagnetic radiation. The cavity 134 is for example configured as a gas-permeable hollow space. The emitter 120 is configured in respect of the wavelength of the emitted electromagnetic radiation 106, 108 in such a way that the analyte can at least partially absorb the emitted electromagnetic radiation 106, 108. From the loss of the electromagnetic radiation (for example in comparison with a reference measurement without analyte), it is possible to deduce the presence or the proportion of analyte in the cavity 134.

The first curved surface 102 may lie opposite the second curved surface 104. The first curved surface 102 may be arranged laterally offset or rotated through an angle about the first focal point 112 of the first curved surface 102 or the second focal point 114 of the second curved surface 104 (for example in the plane of the focal points) with respect to the second curved surface 104. Clearly, in this way the beam-guiding cavity may be folded and its spatial extent may be reduced, the length of the optical cavity being preserved. This allows a compact configuration of the gas sensor 100.

The angle between the connecting lines of the focal points of the first and second curved surfaces may have a magnitude in a range of between 5° and 180°, for example in a range of between 20° and 180°, for example in a range of between 30° and 180°, for example in a range of between 45° and 180°, for example 90°.

In other words: the second focal point 116 of the second curved surface 104 is arranged next to the connecting line 132 of the first and second focal points 112, 110 of the first curved surface 102. The first and second focal points 110/116, 112/114 of the first and second curved surfaces 102, 104 may respectively be arranged at a distance from one another. In other words: the first focal point is not identical to the second focal point respectively for the first curved surface and the second curved surface. Rather, a connecting line (illustrated in FIG. 1 by means of the double arrow) extends with a distance 132 between the focal points of a first curved surface. In other words, the curved surface(s) are not spherical, but rather for example ellipsoidal, parabolic, hyperbolic or the like, or a section or a combination thereof. The curved surface has, for example, the shape of an ellipse halved in the longitudinal direction. The connecting straight lines from a point on the curved surface to the first and second focal points may be mirror images with respect to the normal to the reflective surface at or in this point. As an alternative, the distance difference of points on the curved surface may be constant, for example in the case of a hyperbolically shaped curved surface.

Figure 2:
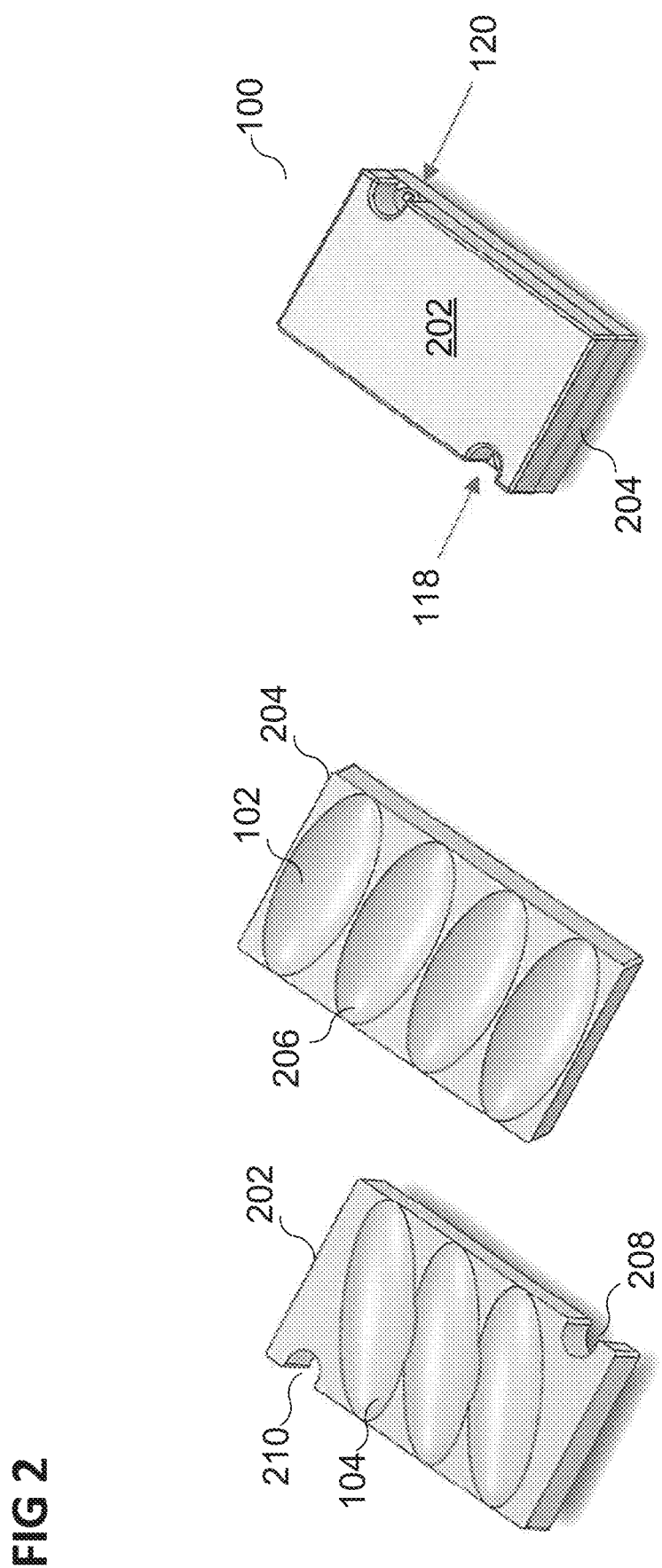
FIG. 2 shows schematic views of a gas sensor having a beam-guiding cavity structure according to various embodiments.
Figure 3A:
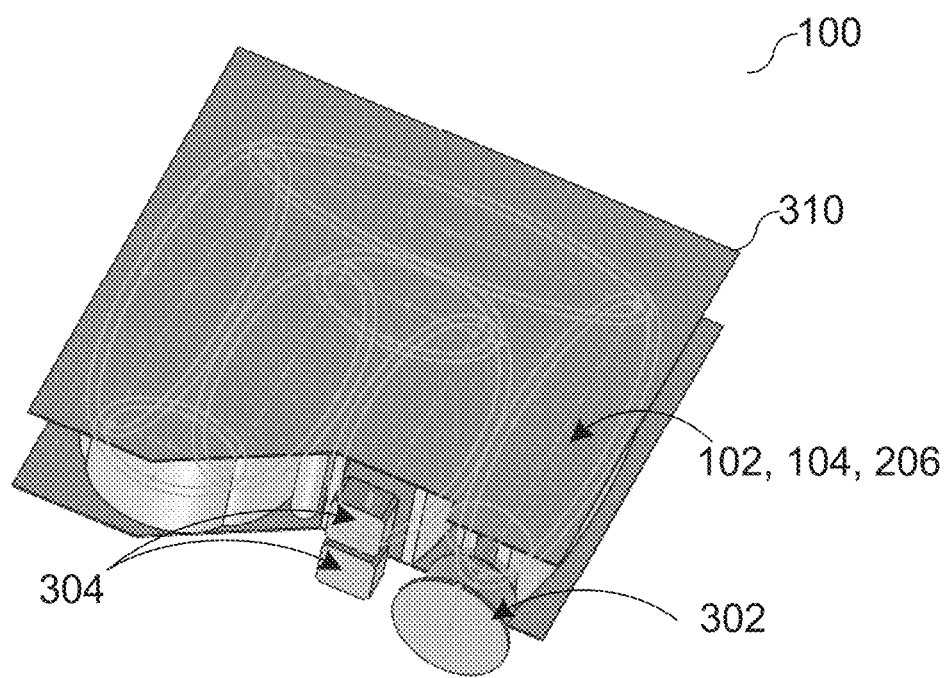
FIG. 3A-3C shows a flowchart of a method for producing a gas sensor having a beam-guiding cavity according to various embodiments.
Figure 3B:
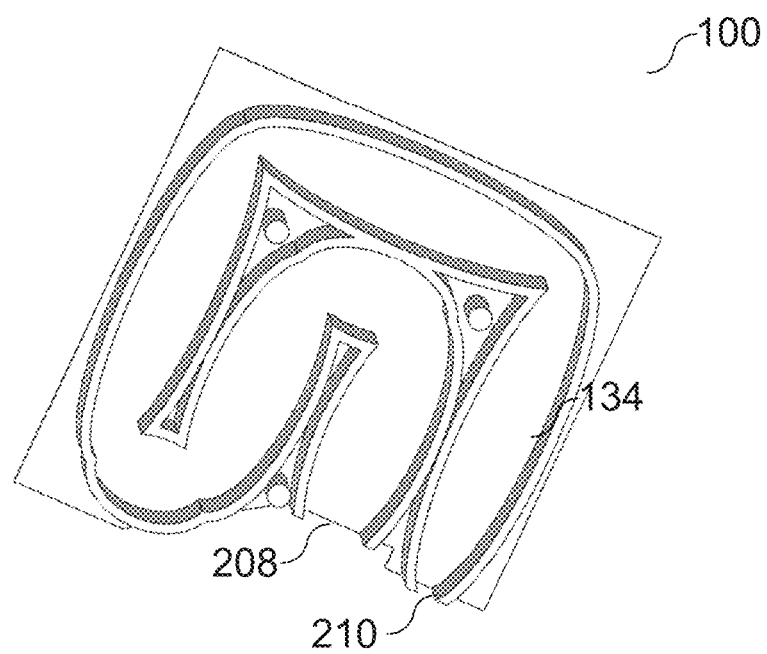
Figure 3C:
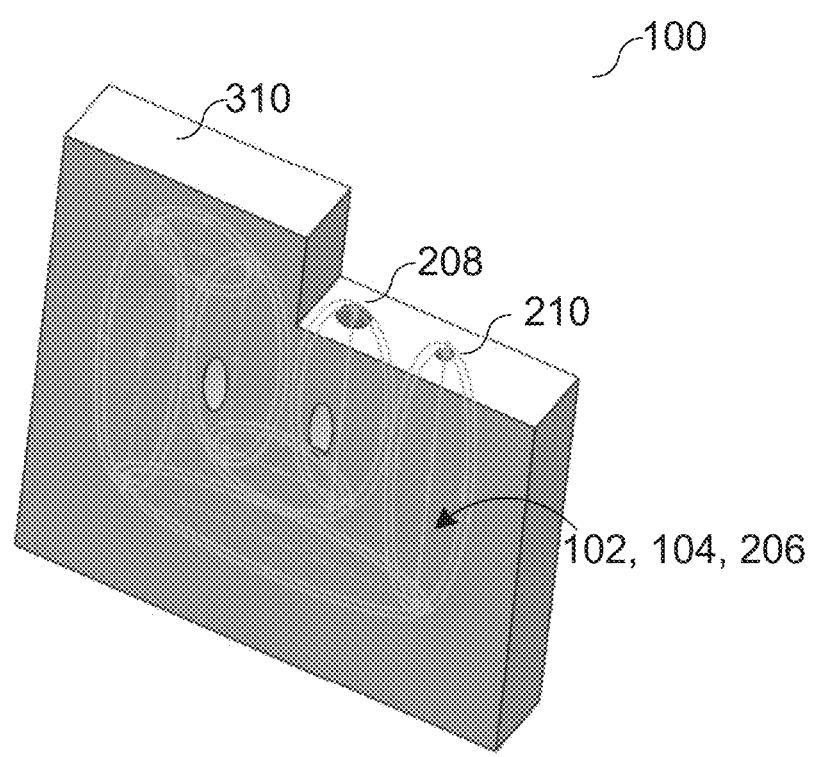

The cavity 134 may be configured in such a way that the connecting line of the first and second focal points of the first curved surface 102 is arranged at an angle with respect to the connecting line of the first and second focal points of the second curved surface 104 (see FIG. 2). As an alternative, the cavity 134 is configured in such a way that the connecting line of the first and second focal points of the first curved surface 102 and the connecting line of the first and second focal points of the second curved surface 104 are arranged on a common straight line, as is illustrated in FIG. 1.

The first and second focal points 110/116, 112/114 of the first and second curved surfaces 102, 104 may be arranged in a common plane—illustrated in FIG. 1 by means of the surface of the carrier 140.

The first and second curved surfaces 110/116, 112/114 may lie opposite one another. As an alternative, the first and second focal points 112, 110 of the first curved surface 102 may be arranged in one first plane and the first and second focal points 114, 116 of the second curved surface 104 may be arranged in a second plane. The second plane may be arranged at a distance from the first plane.

The first curved surface 102 may have the same shape as the second curved surface 104.

The distance 132 between the first and second focal points 112, 110 of the first curved surface 102 may be equal or substantially equal to the distance between the first and second focal points 116, 114 of the second curved surface 104.

In one embodiment, the beam-guiding cavity structure is configured as a beam-guiding tube, for example a light-guide tube.

The cavity 134 may comprise a gas inlet and a gas outlet. The gas inlet and/or a gas outlet is/are for example a multiplicity of openings which extend through the plates or molded bodies, described in more detail below, for example in the form of through-holes which extend from the curved surface. For example, this allows a static, or passive, gas sensor 100 which may be configured without pumps and valves for delivering the analyte into the cavity 134.

As an alternative, the curved surfaces may be configured as substantially continuous surfaces, and a gas inlet may be formed at a first end of the cavity 134 and a gas outlet may be formed at a second end which lies opposite the first end. In this case, the gas to be studied flows through the cavity in the longitudinal direction.

In various exemplary embodiments, the gas sensor 100 is configured as a portable or mobile device, for example as a monolithically integrated device, for example a system-in-package (SiP) device.

In various exemplary embodiments, the gas sensor 100 comprises a reference emitter-detector arrangement. The reference emitter-detector arrangement comprises, for example, a reference detector which is optically coupled to a reference emitter by a beam-guiding reference cavity, for example according to an embodiment described above or below. The beam-guiding reference cavity structure is for example free from analyte, so that its absorption can be determined, can be used to register the ageing of the detector 118 and/or of the emitter 120 and/or can be used to register damage to the beam-guiding cavity structure 130, the detector 118 and/or the emitter 120.

In the context of this description, an emitter 120 may be a semiconductor component which provides electromagnetic radiation, for example in the form of a wired light-emitting diode, a surface-mounted light-emitting diode (surface-mounted device—SMD) or a chip-on-board light-emitting diode (COB).

In the context of this description, a semiconductor chip which can provide electromagnetic radiation may also be understood as an LED chip.

An emitter 120 may, for example, comprise a semiconductor chip which provides electromagnetic radiation (wired LED, SMD) or be configured as a semiconductor chip which provides electromagnetic radiation (chip-on-board).

A package may be applied and/or formed on or over the semiconductor chip. The package may for example be configured as encapsulation, an optical lens and/or as a converter element.

A wired light-emitting diode may comprise a semiconductor chip which can provide electromagnetic radiation, for example an LED chip. The semiconductor chip may, for example, be encapsulated with a plastic cap. The plastic cap may protect the LED chip against detrimental external influences, for example oxygen and/or water, during manufacture and operation.

A surface-mounted light-emitting diode (SMD) may comprise an LED chip in a housing. The housing may be fixed with a fit to a substrate.

A chip-on-board light-emitting diode may comprise an LED chip which is fixed on a substrate, in which case the LED chip may comprise neither a housing nor contact pads.

The individual semiconductor chips may for example be applied or formed on a substrate, for example a circuit board.

The semiconductor chips may be wired to the circuit board by means of contact pads (wire bonding). The wiring may, for example, be carried out by means of gold wires.

In various exemplary embodiments, the emitter 120 is configured as a laser diode.

In various exemplary embodiments, the emitter 120 is configured as a broad-spectrum lamp.

The detector is for example a photodetector, for example a photocell, and may be configured in a similar way to the emitter 120.

FIG. 2 shows schematic views of a gas sensor 100 having a beam-guiding cavity structure 130 according to various embodiments.

FIG. 2 shows a beam-guiding cavity structure having seven elliptical mirror halves, or seven reflective ellipsoid halves, which is produced by means of two plates 202, 204. The beam-guiding cavity structure guides, for example, 95% of the light emitted by the emitter through these seven reflective ellipsoid halves to the detector. The optical path length through the beam-guiding cavity structure is in the range of a few cm, for example in the range of between 1 cm and 10 cm, for example in the range of from 5 cm to 8 cm.

In various exemplary embodiments, the beam-guiding cavity structure 130 comprises a first plate 204, which comprises at least one first cavity with the first curved surface 102, and a second plate 202 which comprises at least one second cavity with the second curved surface 104. The first plate 204 may be connected to the second plate 202 in such a way that the first cavity and the second cavity together form the cavity 134. The first plate 204 may for example be connected to the second plate 202 by means of a screw connection, clamp connection, rivet connection and/or adhesive bond. Adhesives of the adhesive bonds will be described in more detail below.

Producing the beam-guiding cavity structure 130 by means of plates allows simple optical arrangement, or alignment, of the individual (partial) cavities with respect to one another.

The first plate 204 and/or the second plate 202 may be formed from one of the following materials, or the first and/or second curved surface 102, 104 may be formed by a coating, for example on a first carrier, which is formed from this material or comprises such a material: aluminum, silver, gold.

In various exemplary embodiments, the beam-guiding cavity structure 130 comprises at least one third cavity having a third curved surface 206 respectively with at least a first focal point and a second focal point. The beam-guiding cavity structure is configured in such a way that no distance, or substantially no distance, is formed laterally between the second focal point 116 of the second curved surface 104 and the first focal point of the third curved surface 206. The second focal point of the third curved surface 206 is arranged next to the connecting line of the first and second focal points 116, 114 of the second curved surface 104.

As an alternative, the beam-guiding cavity structure 130 comprises a molded body having at least one first cavity with the first curved surface 102 and having at least one second cavity with the second curved surface 104. The first cavity and the second cavity together form the cavity 134. The molded body may be formed from or comprise one of the following materials: aluminum, silver, gold.

The beam-guiding cavity structure is, for example, configured as a carrier 140 into which a part of the cavity 134, for example the part with the second curved surface, is introduced, for example embedded. A further part of the cavity 134 may be formed on the surface of the carrier 140, for example the part with the first curved surface. Openings may be provided in the substrate at the focal points of the second curved surface, and the curved surfaces may be arranged opposite one another (face-to-face) and rotated. This makes it possible that the electromagnetic radiation can be guided through the carrier and guided back to the same side (to the surface of the carrier). This makes it possible to use the volume on both sides of the surface of the substrate.

In other words: the curved surfaces 102, 104 may be produced by means of elliptical mirrors (with an ellipse half as a form factor) which are arranged in the opposite direction to one another with a common focal point. This arrangement may be used to guide the electromagnetic radiation of an emitter, which is arranged at a focal point of one elliptical mirror, to a focal point of another elliptical mirror.

In various exemplary embodiments, the molded body, or the first and/or second plate, is a carrier 140 for the emitter 120 and the detector 118. For example, the carrier 140 comprises reception regions 208, 210 for the emitter 120 and the detector 118, respectively. The reception regions 208, 210 are arranged in the region of a focal point of the first and second curved surfaces. The carrier 140 is or comprises, for example, a flexible film. For example, the carrier 140 is or comprises a plastic film. In various exemplary embodiments, the carrier 140 comprises a metal coating.

The carrier 140 may be configured to be translucent or transparent. The carrier 140 may for example comprise or be formed from glass, quartz and/or a semiconductor material, or any other suitable material. Furthermore, the carrier 140 may comprise or be formed from a plastic film or a laminate having one or more plastic films. The carrier 140 comprises for example a Kapton film (polyimide, PI), a metal foil or a PET film. For example, the carrier 140 may comprise or be formed from a steel foil, a plastic film or a laminate having one or more plastic films. The plastic may comprise or be formed from one or more polyolefins (for example polyethylene (PE) with high or low density or polypropylene (PP)). Furthermore, the plastic may comprise or be formed from polyvinyl chloride (PVC), polystyrene (PS), polyester and/or polycarbonate (PC), polyethylene terephthalate (PET), polyethersulfone (PES), PEEK, PTFE and/or polyethylene naphthalate (PEN). The carrier 140 may comprise or be formed from a metal, for example copper, silver, gold, platinum, iron, for example a metal compound, for example steel. The carrier 140 may be configured as a metal foil or metal-coated film. The carrier 140 may comprise one or more of the materials mentioned above. The carrier 140 may be or form a part of a mirror structure. The carrier 140 may comprise a mechanically rigid region and/or a mechanically flexible region or be configured in this way.

In various exemplary embodiments, the carrier 140 may be a metal-coated film or a metal-coated molded body. The metal-coated film comprises, for example, a metal layer on an above-described plastic film. The carrier 140 may, for example, be or comprise a film or a plastic molded body coated with aluminum or copper.

In various embodiments, the emitter 120 or the detector 118 are connected to one another on the carrier 140 and/or (optionally) the plates 202, 204 are connected to one another by means of a bonder or adhesive. The layer of adhesive may also be referred to as a bonder layer.

In various configurations, the adhesive may comprise or be formed from one of the following substances: a casein, a glutin, a starch, a cellulose, a resin, a tannin, a lignin, an organic substance comprising oxygen, nitrogen, chlorine and/or sulfur; a metal, a silicate, a phosphate, a borate.

In various configurations, the adhesive may comprise or be formed from a hot-melt adhesive, for example a wet adhesive containing solvent, a contact adhesive, a dispersion adhesive, a water-based adhesive, a plastisol; a polymerization adhesive, for example a cyanoacrylate adhesive, a methyl methacrylate adhesive, an anaerobically curing adhesive, an unsaturated polyester, a radiation-curing adhesive; a polycondensation adhesive, for example a phenol-formaldehyde resin adhesive, a silicone, a silane-crosslinking polymer adhesive, a polyimide adhesive, a polysulfide adhesive; and/or a polyaddition adhesive, for example an epoxy resin adhesive, a polyurethane adhesive, a silicone, a pressure-sensitive adhesive.

A hot-melt adhesive may in various exemplary embodiments be a material for the material-bonded connection of two bodies, for example of the light-emitting component 108 to the conductor structure. The hot-melt adhesive may, for example, be a material which is solid at room temperature and which is initially liquefied and then resolidifies in order to connect the bodies. In this case, the hot-melt adhesive can be brought in contact with the two bodies already before the liquefication or only in the liquid state. The hot-melt adhesive may, for example, be liquefied in a convection oven or a reflow oven. The hot-melt adhesive may for example comprise a plastic, for example a synthetic resin, and/or a metal, for example a solder. The solder may, for example, comprise an alloy. The solder may for example comprise lead, tin, zinc, copper, silver, aluminum, silicon and/or glass and/or organic or inorganic additives.

FIGS. 3A, 3B and 3C, FIG. 4 and FIG. 5 show schematic views of a gas sensor 100 having a beam-guiding cavity structure 130 according to various embodiments. Unless otherwise described below, the gas sensor 100 illustrated in the figures may be configured according to an embodiment described above.

The cavity 134 may be formed in or on the carrier by means of two or more plates or by means of a molded body 310 and two or more curved surfaces 102, 104, 206. For example, in the embodiment illustrated in FIG. 3A-C, the cavity 134 is formed by 7 curved surfaces, which are arranged in a meandering shape with respect to one another, or form a meandering shape.

Figure 4:
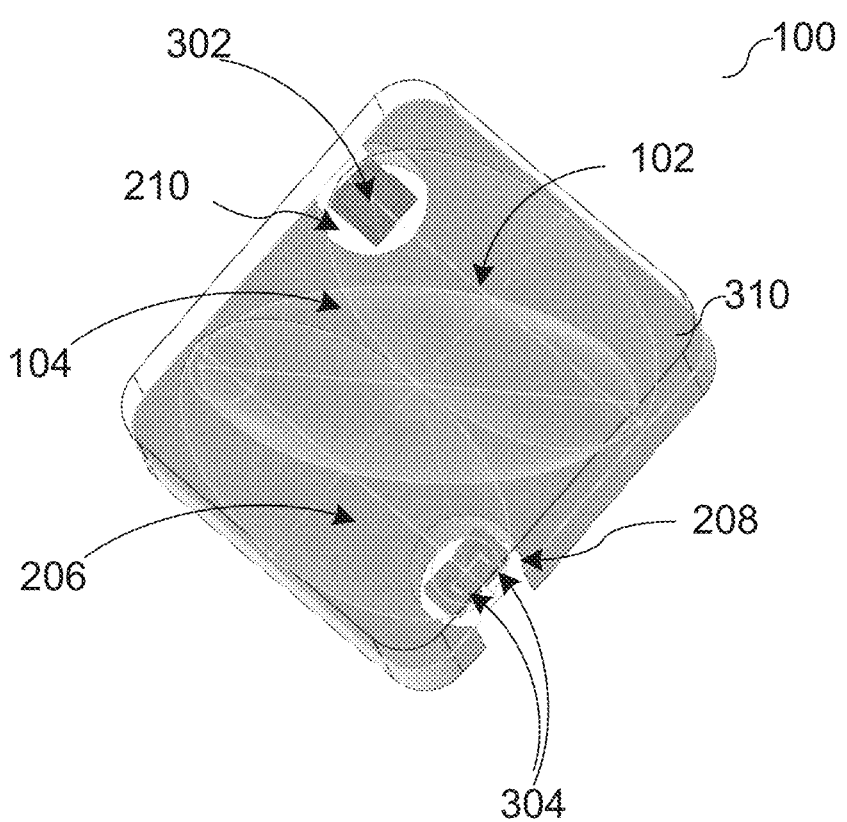
FIG. 4 shows a gas sensor according to embodiments.

In the embodiment illustrated in FIG. 4, the cavity 134 is formed by 3 curved surfaces 102, 104, 206, which are arranged in an S-shape or Z-shape with respect to one another, or form an S-shape or Z-shape.

Figure 5:
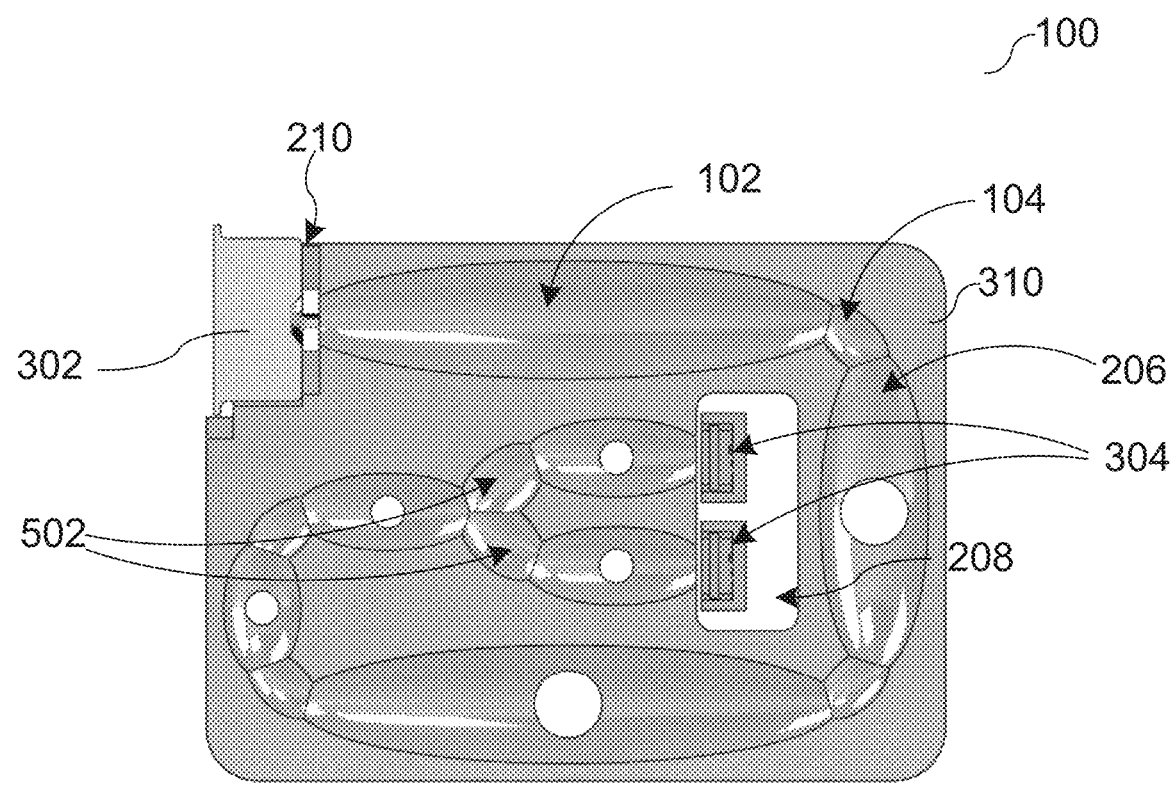
FIG. 5 shows a gas sensor according to further embodiments

In the embodiment illustrated in FIG. 5, the cavity 134 is formed by 13 curved surfaces 102, 104, 206 (only the first 3 of the 13 curved surfaces are provided with references), which are arranged in a spiral shape with respect to one another, or form a spiral shape In various embodiments, the plurality of curved surfaces may have different shapes or dimensions to one another, as is illustrated in FIG. 3A-C and FIG. 5.

The embodiments of a gas sensor 100 as illustrated in FIG. 3A-C and FIG. 5 comprise an emitter 120 and a detector 118 in or on a reception region 208, 210.

The detector 118 in various embodiments comprises two or more individual detectors 304 drivable independently of one another. The individual detectors may be identical or different. For example, one of the individual detectors is used as a reference detector 304 for the other individual detector 304 (also referred to as a sensor detector). As an alternative or in addition, one individual detector 304 may have a higher sensitivity and/or register a different wavelength range than the other individual detector 304. In various exemplary embodiments, the individual detectors 304 of the detector may be used alternately as a sensor detector and reference detector, for example for a single measurement. In this way, changes, for example ageing effects, of the individual detectors may be registered and removed from the measurement result.

The individual detectors 304 may, for example, be arranged above one another (see for example FIG. 3A) or next to one another (see for example FIG. 4) in relation to one another or to the emitter 120 in the reception region 208. The individual detectors may be arranged at or in a first focal point of a common curved surface (illustrated for example in FIG. 3A) or at or in a first focal point of different curved surfaces (illustrated for example in FIG. 5).

The sensor detector 304 may, for example, be arranged at the first focal point of the last curved surface in relation to the curved surface with the emitter 120. The reference detector 304 may be arranged next to the first focal point of this last curved surface. As an alternative, the sensor detector 304 and the reference detector 304 are arranged next to or approximately at the first focal point of the last curved surface, for example symmetrically with respect to the first focal point of the common curved surface.

In various embodiments, the cavity of the gas sensor 100 may comprise a beam splitter structure 502 (illustrated for example in FIG. 5). In a beam splitter structure, the first focal point of two or more curved surfaces respectively coincides, or approximately coincides, with the second focal point of one or more further curved surfaces. In this way, for example, a plurality of individual detectors 304 may respectively be arranged at the first focal point of different curved surfaces, as is illustrated in FIG. 5.

As an alternative or in addition, in a similar way to the embodiments with the two or more individual detectors, the emitter 120 may be provided with two or more identical or different individual emitters 302 in the gas sensor 100. The individual emitters 302 may, for example, be configured to emit electromagnetic radiation of different wavelengths. The individual emitters 302 may be configured so that they can be driven simultaneously, successively or selectably (selectively) in order respectively to emit electromagnetic radiation which can be absorbed by the analyte. In this way, different analytes may be registered and/or similar analytes may be distinguished from one another.

Figure 6:
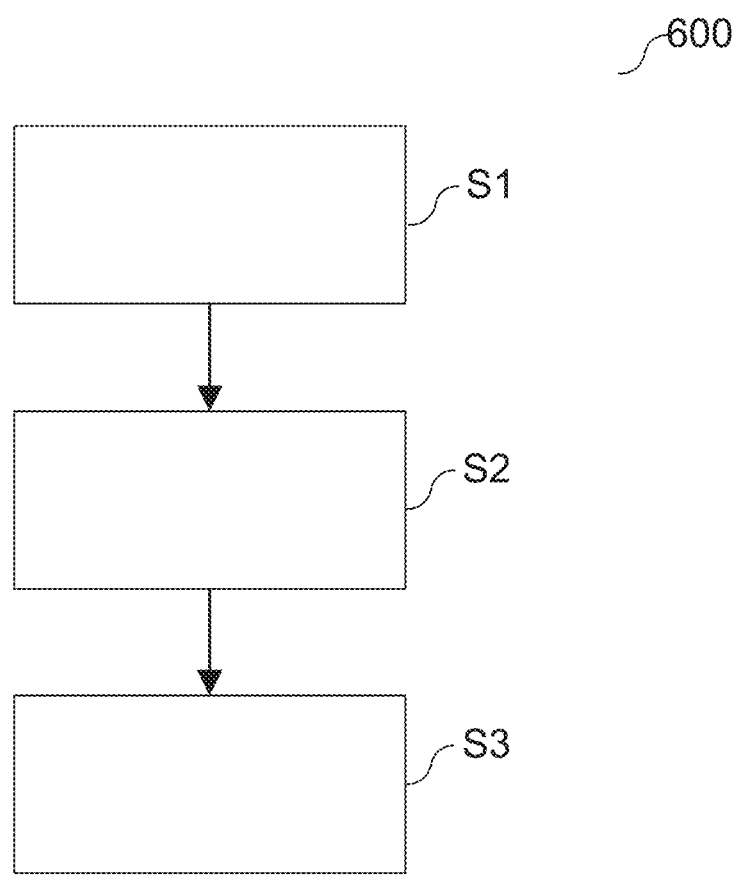
FIG. 6 shows a flowchart of a method for producing a gas sensor having a radiation-guiding cavity according to various embodiments.

FIG. 6 shows a flowchart of a method 600 for producing a gas sensor 100 having a radiation-guiding cavity 134 according to various embodiments.

The method 600 for producing a gas sensor comprises, in S1, comprises the formation of a beam-guiding cavity structure 130 having a cavity 134 with at least one first curved surface 102 and one second curved surface 104. The first and second curved surfaces 102, 104 respectively comprise a first focal point 112, 116 and a second focal point 110, 114, or are correspondingly configured.

The cavity 134 is configured in such a way that no distance, or substantially no distance, is formed laterally between the first focal point 112, 116 of the first curved surface 102 and the first focal point 112, 116 of the second curved surface 104. The second focal point 110, 114 of the second curved surface 104 is arranged next to the connecting line 132 of the first and second focal points 110, 114 of the first curved surface 102.

In S2, the method 600 comprises arrangement of an emitter 120, which is configured to emit electromagnetic radiation 106, 108, in such a way that the emitter 120 is optically coupled to the beam-guiding cavity structure 130.

In S3, the method 600 comprises arrangement of a detector 118, which is configured to detect the electromagnetic radiation 106, 108, in such a way that the detector 118 is optically coupled to the emitter 118 by the beam-guiding cavity structure 130.

The invention is not restricted to the exemplary embodiments specified.

Example 1 is a beam-guiding cavity structure, which comprises: at least one first curved surface and one second curved surface, which span a cavity, the first and second curved surfaces respectively having at least one first focal point and one second focal point, wherein the cavity is configured in such a way that no distance, or substantially no distance, is formed laterally between the first focal point of the first curved surface and the second focal point of the second curved surface; and wherein the first focal point of the second curved surface is arranged next to the connecting line of the first and second focal points of the first curved surface.

In Example 2, the beam-guiding cavity structure according to Example 1 optionally comprises that the first and second focal points of the first and second curved surfaces are arranged in a common plane.

In Example 3, the beam-guiding cavity structure according to Example 1 or 2 optionally comprises that the first and second curved surfaces are arranged opposite one another.

In Example 4, the beam-guiding cavity structure according to one of Examples 1 to 3 optionally comprises that the cavity is configured in such a way that the connecting line of the first and second focal points of the first curved surface is arranged at an angle with respect to the connecting line of the first and second focal points of the second curved surface.

In Example 5, the beam-guiding cavity structure according to one of Examples 1 to 4 optionally comprises that the first curved surface has the same shape as the second curved surface.

In Example 6, the beam-guiding cavity structure according to one of Examples 1 to 5 optionally comprises that the first curved surface and/or the second curved surface is/are configured to be specularly reflective.

In Example 7, the beam-guiding cavity structure according to one of Examples 1 to 6 furthermore comprises: a first plate, which comprises at least one first cavity with the first curved surface, and a second plate, which comprises at least one second cavity with the second curved surface, wherein the first plate is connected to the second plate in such a way that the first cavity and the second cavity together form the cavity.

In Example 8, the beam-guiding cavity structure according to one of Examples 1 to 6 furthermore comprises: a molded body having at least one first cavity with the first curved surface and at least one second cavity with the second curved surface, wherein the first cavity and the second cavity together form the cavity.

In Example 9, the beam-guiding cavity structure according to one of Examples 1 to 8 furthermore comprises: at least one third curved surface having a first focal point and a second focal point, wherein the cavity is configured in such a way that no distance, or substantially no distance, is formed laterally between the first focal point of the second curved surface and the second focal point of the third curved surface; and wherein the first focal point of the third curved surface is arranged next to the connecting line of the first and second focal points of the second curved surface.

Example 10 is gas sensor, which comprises a beam-guiding cavity structure having: at least one first curved surface and one second curved surface, which span a cavity, the first and second curved surfaces respectively having at least one first focal point and one second focal point, wherein the cavity is configured in such a way that no distance, or substantially no distance, is formed laterally between the first focal point of the first curved surface and the second focal point of the second curved surface; and wherein the first focal point of the second curved surface is arranged next to the connecting line of the first and second focal points of the first curved surface; and an emitter configured to emit electromagnetic radiation and a detector which is configured to detect the electromagnetic radiation, wherein the detector is optically coupled to the emitter by the beam-guiding cavity structure.

In Example 11, the gas sensor according to Example 10 optionally comprises that the emitter is arranged at the second focal point of the first curved surface.

In Example 12, the gas sensor according to Example 10 or 11 optionally comprises that the detector is arranged at the first focal point of the second curved surface; or that the detector is arranged at a first focal point of at least one further curved surface, the further curved surface being optically coupled by means of a second focal point indirectly or directly to the first focal point of the second curved surface. Directly coupled is in this case to be understood as meaning that the second focal point of the further curved surface is identical in position at least laterally without a distance to the first focal point of the second curved surface. Indirectly coupled is to be understood as meaning that at least one further curved surface is also arranged between the second focal point of the further curved surface and the first focal point of the second curved surface.

In Example 13, the gas sensor according to one of Examples 10 to 12 furthermore comprises: a reference emitter-detector arrangement configured to register absorption of the electromagnetic radiation by the gas, ageing of the emitter, ageing of the detector and/or damage to the beam-guiding cavity structure.

In Example 14, the beam-guiding cavity structure according to one of Examples 10 to 13 optionally comprises that the first and second focal points of the first and second curved surfaces are arranged in a common plane.

In Example 15, the beam-guiding cavity structure according to one of Examples 10 to 14 optionally comprises that the first and second curved surfaces lie opposite one another.

In Example 16, the beam-guiding cavity structure according to one of Examples 10 to 15 optionally comprises that the cavity is configured in such a way that the connecting line of the first and second focal points of the first curved surface is arranged at an angle with respect to the connecting line of the first and second focal points of the second curved surface.

In Example 17, the beam-guiding cavity structure according to one of Examples 10 to 16 optionally comprises that the first curved surface has the same shape as the second curved surface.

In Example 18, the beam-guiding cavity structure according to one of Examples 10 to 17 optionally comprises that the first curved surface and/or the second curved surface is/are configured to be specularly reflective.

In Example 19, the beam-guiding cavity structure according to one of Examples 10 to 18 furthermore comprises: a first plate, which comprises at least one first cavity with the first curved surface, and a second plate, which comprises at least one second cavity with the second curved surface, wherein the first plate is connected to the second plate in such a way that the first cavity and the second cavity together form the cavity.

In Example 20, the beam-guiding cavity structure according to one of Examples 1 to 19 furthermore comprises: a molded body having at least one first cavity with the first curved surface and at least one second cavity with the second curved surface, wherein the first cavity and the second cavity together form the cavity.

In Example 21, the beam-guiding cavity structure according to one of Examples 10 to 20 furthermore comprises: at least one third curved surface having a first focal point and a second focal point, wherein the cavity is configured in such a way that no distance, or substantially no distance, is formed laterally between the first focal point of the second curved surface and the second focal point of the third curved surface; and wherein the first focal point of the third curved surface is arranged next to the connecting line of the first and second focal points of the second curved surface.

Example 22 is a method for producing a beam-guiding cavity structure, the method comprising: formation S1 of a beam-guiding cavity structure having at least one first curved surface and one second curved surface, which span a cavity, the first and second curved surfaces respectively having at least one first focal point and one second focal point, wherein the cavity is configured in such a way that no distance, or substantially no distance, is formed laterally between the first focal point of the first curved surface and the second focal point of the second curved surface; and wherein the first focal point of the second curved surface is arranged next to the connecting line of the first and second focal points of the first curved surface.

In Example 23, the method according to Example 22 optionally comprises that the first and second focal points of the first and second curved surfaces are arranged in a common plane.

In Example 24, the method according to Example 22 or 23 optionally comprises that the first and second curved surfaces are arranged opposite one another.

In Example 25, the method according to one of Examples 22 to 24 optionally comprises that the cavity is configured in such a way that the connecting line of the first and second focal points of the first curved surface is arranged at an angle with respect to the connecting line of the first and second focal points of the second curved surface.

In Example 26, the method according to one of Examples 22 to 25 optionally comprises that the first curved surface has the same shape as the second curved surface.

In Example 27, the method according to one of Examples 22 to 26 optionally comprises that the first curved surface and/or the second curved surface is/are configured to be specularly reflective.

In Example 28, the method according to one of Examples 22 to 27 furthermore comprises that the beam-guiding cavity structure is formed by means of a first plate, which comprises at least one first cavity with the first curved surface, and a second plate, which comprises at least one second cavity with the second curved surface, wherein the first plate is connected to the second plate in such a way that the first cavity and the second cavity together form the cavity.

In Example 29, the method according to one of Examples 22 to 27 furthermore comprises that the beam-guiding cavity structure is formed by means of a molded body having at least one first cavity with the first curved surface and at least one second cavity with the second curved surface, wherein the first cavity and the second cavity together form the cavity.

In Example 30, the method according to one of Examples 22 to 29 furthermore comprises that at least one third curved surface having a first focal point and a second focal point optionally comprises that the cavity is configured in such a way that no distance, or substantially no distance, is formed laterally between the first focal point of the first curved surface and the second focal point of the third curved surface; and wherein the first focal point of the third curved surface is arranged next to the connecting line of the first and second focal points of the second curved surface.

Example 31 is a method 600 for producing a gas sensor, the method comprising: formation S1 of a beam-guiding cavity structure having cavity with at least one first curved surface and one second curved surface, wherein the first and second curved surfaces respectively have a first focal point and a second focal point, wherein the cavity is configured in such a way that no distance, or substantially no distance, is formed laterally between the first focal point of the first curved surface and the first focal point of the second curved surface; and wherein the second focal point of the second curved surface is arranged next to the connecting line of the first and second focal points of the first curved surface, arrangement S2 of an emitter, which is configured to emit electromagnetic radiation, so that the emitter is optically coupled to the beam-guiding cavity structure, and arrangement S3 of the detector, which is configured to detect the electromagnetic radiation, so that the detector is optically coupled to the emitter by the beam-guiding cavity structure.

In Example 32, the method according to Example 31 optionally comprises that the emitter is arranged at the second focal point of the first curved surface.

In Example 33, the method according to Example 30 or 31 optionally comprises that the detector is arranged at the first focal point of the second curved surface; or that the detector is arranged at a first focal point of the at least one further curved surface, the further curved surface being optically coupled by means of a second focal point indirectly or directly to the first focal point of the second curved surface.

In Example 34, the method according to one of Examples 31 to 33 furthermore optionally comprises: formation of a reference emitter-detector arrangement, which is configured to register absorption of the electromagnetic radiation by the gas, ageing of the emitter, ageing of the detector and/or damage to the beam-guiding cavity structure.

In Example 35, the method according to one of Examples 30 to 34 optionally comprises that the first and second focal points of the first and second curved surfaces are arranged in a common plane.

In Example 36, the method according to one of Examples 30 to 35 optionally comprises that that the first and second curved surfaces are arranged opposite one another.

In Example 37, the method according to one of Examples 30 to 36 optionally comprises that the cavity is configured in such a way that the connecting line of the first and second focal points of the first curved surface is arranged at an angle with respect to the connecting line of the first and second focal points of the second curved surface.

In Example 38, the method according to one of Examples 30 to 37 optionally comprises that the first curved surface has the same shape as the second curved surface.

In Example 39, the method according to one of Examples 30 to 38 optionally comprises that the first curved surface and/or the second curved surface is/are configured to be specularly reflective.

In Example 40, the method according to one of Examples 30 to 39 furthermore comprises that the beam-guiding cavity structure is formed by means of a first plate, which comprises at least one first cavity with the first curved surface, and a second plate, which comprises at least one second cavity with the second curved surface, wherein the first plate is connected to the second plate in such a way that the first cavity and the second cavity together form the cavity.

In Example 41, the method according to one of Examples 30 to 39 furthermore comprises that the beam-guiding cavity structure is formed by means of a molded body having at least one first cavity with the first curved surface and at least one second cavity with the second curved surface, wherein the first cavity and the second cavity together form the cavity.

In Example 42, the method according to one of Examples 30 to 41 furthermore comprises that at least one third curved surface having a first focal point and a second focal point optionally, wherein the cavity is configured in such a way that no distance, or substantially no distance, is formed laterally between the first focal point of the second curved surface and the second focal point of the third curved surface; and wherein the first focal point of the third curved surface is arranged next to the connecting line of the first and second focal points of the second curved surface.

Beam-guiding cavity structure according to one of the preceding examples, furthermore comprising: at least one further curved surface having a first focal point and a second focal point, wherein the cavity is configured in such a way that no distance, or substantially no distance, is formed laterally between the first focal point of the first curved surface and the second focal point of the further curved surface; and wherein the first focal point of the further curved surface is arranged next to the connecting line of the first and second focal points of the second curved surface.

Although the invention has been illustrated and described in detail by means of the preferred embodiment examples, the present invention is not restricted by the disclosed examples and other variations may be derived by the skilled person without exceeding the scope of protection of the invention.

The invention claimed is:
1. A gas sensor comprising:
   a beam-guiding cavity structure comprising:
      at least one first curved surface, one second curved surface and one third curved surface spanning a cavity, the first, second and third curved surfaces respectively having at least one first focal point and at least one second focal point,
      wherein the cavity is configured such that substantially no distance is laterally formed between the first focal point of the first curved surface and the second focal point of the second curved surface,
      wherein the cavity is further configured such that substantially no distance is laterally formed between the first focal point of the second curved surface and the second focal point of the third curved surface,
      wherein the first focal point of the second curved surface is arranged next to a connecting line of the first and second focal points of the first curved surface,
      wherein the first focal point of the third curved surface is arranged next to a connecting line of the first and second focal points of the second curved surface, and
      wherein the first, second and third curved surfaces have different shapes or dimensions to one another;
   an emitter configured to emit electromagnetic radiation;
   a detector configured to detect the electromagnetic radiation, wherein the detector is optically coupled to the emitter by the beam-guiding cavity structure; and a reference emitter-detector arrangement configured to register:
an ageing of the emitter;
an ageing of the detector; and
a damage to the beam-guiding cavity structure.

2. The gas sensor as claimed in claim 1, wherein the first and second curved surfaces lie opposite one another.

3. The gas sensor as claimed in claim 1, wherein the cavity is configured such that the connecting line of the first and second focal points of the first curved surface is arranged at an angle with respect to the connecting line of the first and second focal points of the second curved surface.

4. The gas sensor as claimed in claim 1, wherein the first curved surface and/or the second curved surface is/are configured to be specularly reflective.

5. The gas sensor as claimed in claim 1, wherein the beam-guiding cavity structure comprises:
a first plate comprising at least one first cavity with the first curved surface; and
a second plate comprising at least one second cavity with the second curved surface, and
wherein the first plate is connected to the second plate such that the first cavity and the second cavity together form the cavity.

6. The gas sensor as claimed in claim 1, wherein the beam-guiding cavity structure comprises a molded body having at least one first cavity with the first curved surface and at least one second cavity with the second curved surface, and wherein the first cavity and the second cavity together form the cavity.

7. The gas sensor as claimed in claim 1, wherein the beam-guiding cavity structure comprises
at least one further curved surface having a first focal point and a second focal point,
wherein the cavity is configured such that substantially no distance is laterally formed between the first focal point of the third curved surface and the second focal point of the further curved surface, and
wherein the first focal point of the further curved surface is arranged next to the connecting line of the first and second focal points of the third curved surface.

8. The gas sensor as claimed in claim 1, wherein the first and second focal points of the first and second curved surfaces are arranged in a common plane.

9. The gas sensor as claimed in claim 1, wherein the emitter is arranged at the second focal point of the first curved surface, and wherein the detector is arranged at the first focal point of the third curved surface.

10. The gas sensor as claimed in claim 1, wherein the first, second and third curved surfaces are arranged in a spiral shape with respect to one another, or form a spiral shape.

11. The gas sensor as claimed in claim 1, wherein the reference emitter-detector arrangement is configured to register an absorption of the electromagnetic radiation by gas.

12. A method for producing a gas sensor, the method comprising:
forming a beam-guiding cavity structure having a cavity with at least one first curved surface, one second curved surface and one third curved surface,
wherein the first, second and third curved surfaces respectively have a first focal point and a second focal point,
wherein the first focal point of the second curved surface is arranged next to a connecting line of the first and second focal points of the first curved surface,
wherein the first focal point of the third curved surface is arranged next to a connecting line of the first and second focal points of the second curved surface;
arranging an emitter for emitting electromagnetic radiation so that the emitter is optically coupled to the beam-guiding cavity structure;
arranging a detector for detecting the electromagnetic radiation so that the detector is optically coupled to the emitter by the beam-guiding cavity structure; and
arranging a reference emitter-detector arrangement for registering an ageing of the emitter an ageing of the detector and a damage to the beam-guiding cavity structure.

13. The gas sensor as claimed in claim 9, wherein the emitter is arranged at the second focal point of the first curved surface, and wherein the detector is arranged at the first focal point of the third curved surface.

14. The gas sensor as claimed in claim 1, wherein the emitter is arranged at the second focal point of the first curved surface, and wherein the detector is arranged at the first focal point of the third curved surface.

15. The gas sensor as claimed in claim 1, wherein the beam-guiding cavity structure comprises exactly 3 curved surfaces arranged in a S shape or a Z shape.

16. The gas sensor as claimed in claim 1, wherein the beam-guiding cavity structure comprises exactly 7 curved surfaces arranged in a meandering shape.

17. The gas sensor as claimed in claim 1, wherein the beam-guiding cavity structure comprises exactly 13 curved surfaces arranged in a spiral shape.

* * * * *